Patented Mar. 6, 1951

2,544,334

UNITED STATES PATENT OFFICE 2,544,334

WELD ROD, FLUX, AND METHOD

George Edwin Linnert, Baltimore, Md., assignor, by mesne assignments, to Armco Steel Corporation, a corporation of Ohio No Drawing. Application November 23, 1944, Serial No. 565,573

7 Claims. (Cl. 148—26)

My invention relates to the welding of steel, more particularly to welding rods and welded joints.

An object of my invention is the provision of a simple, direct and thoroughly satisfactory method of producing high quality flux compositions for use in welding steels such as stainless steel.

A further object of my invention is the provision of substantially hydrogen-free flux products having utility in forming weld deposits of stainless steel.

A further object of my invention in part will be obvious and in part will be pointed out hereinafter.

Other objects of my invention in part will be obvious and in part will be pointed out hereinafter.

The invention accordingly consists in the combination of elements, composition of materials, features of products, in the various steps, and in the relation of each of the same to one or more of the others as described herein, the scope of the application of which is indicated in the following claims.

As conducive to a clearer understanding of certain features of my invention it may be noted at this point that stainless steel is defined as a low-carbon alloy steel which comprises 10% to 35% or more chromium, with or without nickel, and with or without supplemental additions of manganese, silicon, cobalt, copper, molybdenum, tungsten, vanadium, columbium, titanium, sulphur, or the like, for special purposes, and a balance which is substantially all iron.

Stainless steel is recognized in the prior art of metal welding as being a weldable metal, and as a filler for parent stainless steel or for parent carbon steel such as armor plate. In producing welds in stainless steel, or welds while employing a stainless steel filler, it is customary to introduce a molten flux having substantial viscosity to the developing weld for dissolving and slagging out oxides and for forming a protective covering over the molten weld metal.

Among the better known forms of stainless steel filler products are weld rods or arc welding electrodes which include ferroalloys or metal powder or both for yielding a deposit having a composition which for example is substantially equivalent to that of the parent metal. These rods customarily include a solid flux such as in the form of a coating which fuses at welding temperature and is deposited along with the metallic rod components.

In the past, much difficulty has been encountered in providing physically sound welds in steel parent metal, such as stainless steel, with stainless steel fillers. A tendency of oxides, illustratively rich in chromium, to form on the metal surface whether it be on the parent metal or on the filler during deposition leads to faulty welds. The formation of oxides is difficult to arrest and, moreover, the oxides are troublesome to eliminate except with certain fluxes. In this connection, a number of mineral-type fluxes, which display important and advantageous properties in the deposition of stainless steel fillers and in the formation of welds in steel such as stainless steel, hardenable steels or armor plate have come into widely accepted use. There are, however, a number of problems associated with the use of mineral fluxes. The resulting welds obtained frequently contain blowholes, gas pockets and interfacial cracks between the filler and the parent metal, which I find are directly attributable to the conventional forms of mineral type fluxes.

An outstanding object of my invention accordingly is the provision of a welding flux comprising an abundance of fluxing matter of mineral character, which flux is reliable for use with stainless steel filler in the production of welds characterized by substantial freedom from blowholes, gas pockets and interfacial cracks.

Referring now more particularly to the practice of my invention, I provide for use in forming welds as by depositing stainless steel filler from weld rod electrodes to parent steel, any of a variety of substantially hydrogen-free flux compositions. Illustratively these are weld rod coatings, comprising an abundance of one or more substantially completely dehydrated fluxing minerals of the group consisting of metallic oxides, silicates, carbonates, chromates and fluorides. The metallic oxides employed are those of iron, lithium, magnesium, manganese, titanium, or zirconium, these serving as flux-formers and stabilizers of the electric arc. Also there are employed those of chromium, cobalt, columbium, copper, molybdenum and nickel which serve as sources of the particular metals. The silicates, especially asbestos, clay, feldspar, mica, talc and zirconium minerals serve as a combination plasticizer, slag-former, flux and arc-stabilizer; other silicates, for example, water-glass serving as binders. The aluminates especially diaspore and/or alumina and carbonates such as limestone, magnesium carbonate, manganese carbonate, iron carbonate, are employed to give slag bulk, the latter group, in addition, serving to help stabilize the arc, flux the oxides present and generate a protective gaseous atmosphere in welding. The chromates, such as strontium chromate, and the fluorides, such as cryolite and fluorspar are employed principally as fluxes for the oxides, the fluorides additionally aiding in the stabilization of the arc.

In addition to the ingredients mentioned above other components or constituents usually are included in my welding flux compositions, as a finely divided ingredient or ingredients of the weld filler to be deposited as for example one or more ferroalloys of the group consisting of ferromanganese, ferrochromium, ferrochrome-nickel, or the like, with or without material or materials such as inorganic or mineral matter for regulating slag viscosity particularly when the flux compositions are used as coatings for weld rods, and preferably a binder such as sodium silicate.

In the provision of flux compositions of the character described I find advantage in heating at least some of the ingredients having relatively high temperature stability, such as one or more mineral flux ingredients persistent in retaining amounts of water harmful to the weld, separately from ingredients having relatively low decomposition temperatures, such as certain viscosity regulating materials and/or binders. With the separate heating I effectively remove both water of crystallization and water of constitution from the more stable ingredient or ingredients preferably substantially below melting temperature range of the same yet at relatively high temperature as compared with the decomposition temperature range of the less stable matter. Then, the less stable matter is heated in a temperature range sufficiently low as to avoid substantial volatilization of important flux constituents thereof and yet sufficiently high as to ensure substantially complete removal of water from the same. I prefer to dry the less stable matter in the manner just described after mixing the same with all other ingredients to be employed in the entire or final flux composition; which enables the provision of a finished welding flux product, such as a hard baked flux coating on weld rods, with a minimum number of operation steps.

As illustrative of the practice of my invention I provide from available sources of mineral supply, quantities of limestone, fluorspar, titania and asbestos for use as mineral ingredients in the production of one of my welding flux compositions. Of these minerals the asbestos usually contains water in amounts ranging between 5% and 15% by weight which I find must be thoroughly removed to avoid the ultimate obtainment of defective welds. On the other hand the limestone, which also contains water, will decompose with consequent loss of important elements if dried along with the asbestos when temperatures sufficiently high to effect thorough removal of water from the asbestos are maintained. I therefore substantially completely remove both water of crystallization and water of constitution from the asbestos by heating the mineral independently of the limestone, as in a suitable drying furnace or kiln, for a sufficiently long period of time at temperatures illustratively in the neighborhood of 1100° F. up to melting temperature range of the asbestos. I also find advantage in removing any and substantially all water of crystallization and water of constitution from the fluorspar and titania below melting temperatures of the same as by separate heating preferably in finely divided condition or by heating along with the asbestos.

The substantially completely dry asbestos obtained as a result of the heating usually is in the form of small short fibers and as such or in other finely divided condition is mixed with the other minerals also in finely divided state such as in pulverized or powdered form; that is, with the preferably dried fluorspar and titania, and the limestone illustratively yet undried, so as to obtain a mineral mixture in which all materials mentioned are present preferably in abundant quantities. At times I also introduce powder of ferroalloy metal or metals in the mineral mixture formed to afford a source or partial source of stainless steel weld filler metal.

To the mixture of mineral materials thus obtained, either with or without the ferroalloy powder, I prefer to add liquid sodium silicate or other suitable matter in amount sufficient to serve as a binder and again mix the ingredients together thoroughly. The mineral flux composition with binder included illustratively is applied as a surface coating to an arc welding electrode core of weld filler metal such as to a rod-type core of 20% chromium—10% nickel stainless steel. I then bake the flux coating composition at a temperature of about 700° F. for example and thus substantially completely dehydrate the limestone and binder without harmfully decomposing the same. The resulting baked product includes a hard coherent and substantially completely water-free welding flux which is ready for use or sale as for the welding of stainless steel or armor plate.

Also in the practice of my invention I form welds illustratively in armor plate or in hard or hardenable stainless steel, while employing at the weld substantially water and hydrogen-free mineral flux of the character described herein. The dehydrated flux enables the obtainment of welds, joints and welded products which at the points of welding are characterized by substantial freedom from hydrogen embrittlement, gas pockets, blowholes, and cracks at the interface of the parent metal and filler. Usually I find advantage in forming the weld deposit or welded joint with a rod or arc welding electrode which includes a core of weld filler metal such as the 20% chromium-10% nickel core described hereinbefore, and one of my mineral flux compositions as a coating. I melt down the rod, as with arc welding equipment during multiple passes, to form a flux covered deposit or flux covered beads of filler metal joining the parent metal to be welded. Finally upon completing the deposit I obtain a weld which is substantially free of hydrogen flaws.

Thus it will be seen that in this invention there are provided both weld-forming products and welded joints and methods of producing the same in which the various objects hereinbefore noted together with many thoroughly practical advantages are successfully achieved. It will be observed that the methods illustrated herein are instrumental to the obtainment of high quality welds in steel with substantially hydrogen-free mineral welding flux and a source or sources of stainless steel filler.

As many possible embodiments may be made of my invention and as many changes may be made in the embodiments hereinbefore set forth, it is to be understood that all matter described herein is to be interpreted as illustrative and not as a limitation.

I claim:

1. In producing a substantially water-free welding flux composition, the art which comprises heating a hydrous mixture of asbestos, titania and fluorspar to a temperature of about 1100° F. for removing substantially all water of constitution from the same, adding hydrous limestone to the mixture, and heating the complete mixture at a temperature of about 700° F. for achieving dehydration to substantial completeness without decomposing the limestone.

2. In a method of producing a substantially water-free welding flux composition containing at least one hydrous ingredient of a first group consisting of mineral metallic oxides, silicates, chromates and fluorides containing water of crystallization and constitution, and a hydrous carbonate as a second group, the art of which includes independently heating said first group of hydrous mineral metallic ingredient at a temperature of about 1100° F. to remove substantially all water of constitution from the same; adding said hydrous carbonate; and heating the complete mixture at a temperature of about 700° F. to dehydrate the flux to substantial completeness without decomposing the carbonate.

3. A welding flux composition substantially free of hydrogen-yielding constituents and containing at least one hydrous ingredient of the group consisting of mineral metallic oxides, silicates, chromates, and fluorides initially containing water of crystallization and constitution, dehydrated at a temperature of about 1100° F. to remove water of crystallization and constitution, and mixed with an initially hydrous carbonate, and the whole mix having been heated at a temperature of about 700° F. to dehydrate the flux to substantial completeness without decomposing the carbonate.

4. In producing a weld rod having a coating substantially free of hydrogen-yielding constituents at welding temperatures, the art which comprises providing welding flux coating composition of at least one hydrous ingredient of the group consisting of mineral metallic oxides, silicates, chromates and fluorides, dehydrated at a temperature of about 1100° F. for removing substantially all water of constitution from the same and mixed with ferroalloy metal powder, hydrous limestone and a suitable binder; applying said coating composition to said core; and baking the coating at a temperature of about 700° F. for achieving dehydration of the coating to substantial completeness without decomposing the limestone.

5. In producing a weld rod having a coating substantially free of hydrogen-yielding constituents at welding temperatures, the art which comprises preparing a weld rod coating composition essentially consisting of initially hydrous asbestos, and fluorspar dehydrated at a temperature of about 1100° F. for removing substantially all water of constitution from the same and subsequently mixed with hydrous mineral limestone and a binder; applying the coating composition to the weld rod core; and affixing the coating by baking the weld rod at a temperature of about 700° F. for achieving dehydration of the coating to substantial completeness without decomposing the limestone.

6. A weld rod substantially free of hydrogen-yielding constituents comprising in combination, a source of chromium-nickel stainless steel weld filler material; and a flux containing at least one hydrous ingredient of the group consisting of mineral metallic oxides, silicates, chromates and fluorides, dehydrated at a temperature of about 1100° F. to remove substantially all water of constitution from the same, and hydrous limestone and water glass subsequently dehydrated by heating the mixture at a temperature of about 700° F. for achieving dehydration of the flux to substantial completeness without decomposing the limestone.

7. A weld rod substantially free of hydrogen-yielding constituents at welding temperatures comprising in combination, a stainless steel core; and a flux coating thereon essentially containing initially hydrous asbestos preliminarily dehydrated at a temperature of about 1100° F. to remove all water of constitution from the same, powdered ferroalloy metal and initially hydrous limestone with a binder, the coating having been dehydrated by baking the rod with applied coating at a temperature of about 700° F. for achieving dehydration of the flux coating to substantial completeness without decomposing the limestone.

GEORGE EDWIN LINNERT.

REFERENCES CITED

The following references are of record in the file of this patent:

UNITED STATES PATENTS

| Number | Name | Date |
|---|---|---|
| 1,669,661 | Green | May 15, 1928 |
| 1,754,063 | Stresau | Apr. 8, 1930 |
| 1,762,483 | Norwood | June 10, 1930 |
| 1,852,021 | Miller | Apr. 5, 1932 |
| 1,925,916 | Arness | Sept. 5, 1933 |
| 1,972,067 | Pennington | Aug. 28, 1934 |
| 1,994,679 | Arness | Mar. 19, 1935 |
| 2,000,861 | Miller | May 7, 1935 |
| 2,010,605 | Miller | Aug. 6, 1935 |
| 2,021,628 | Larson | Nov. 19, 1935 |
| 2,048,174 | Austin | July 21, 1936 |
| 2,067,630 | Franks | Jan. 12, 1937 |
| 2,077,397 | Christensen | Apr. 20, 1937 |
| 2,085,431 | Johnston | June 29, 1937 |
| 2,113,937 | Franks | Apr. 12, 1938 |
| 2,141,929 | Moritz | Dec. 27, 1938 |
| 2,145,009 | Keir | Jan. 24, 1939 |
| 2,150,625 | Jones et al. | Mar. 14, 1939 |
| 2,168,185 | Alexander | Aug. 1, 1939 |
| 2,191,473 | Blumberg | Feb. 27, 1940 |
| 2,223,230 | Shepherd | Nov. 26, 1940 |
| 2,228,639 | Miller | Jan. 14, 1941 |
| 2,258,675 | Cohn | Oct. 14, 1941 |
| 2,269,167 | Somerville et al. | Jan. 6, 1942 |
| 2,368,280 | Wilson | Jan. 26, 1945 |
| 2,432,773 | Lee | Dec. 16, 1947 |

FOREIGN PATENTS

| Number | Country | Date |
|---|---|---|
| 519,128 | Great Britain | Mar. 18, 1940 |
| 554,804 | Great Britain | July 20, 1943 |

OTHER REFERENCES

"Welding Stainless Steel," 1943, by Allegheny Ludlum Steel Corp., Brackenridge, Pa., pp. 37 to 39 and 42 to 45.

"Defects in weld metal and hydrogen in steel," The Welding Journal, October 1940, pages 387-s, 392-s and 394-s.